United States Patent
Sangubhatla et al.

(10) Patent No.: US 8,819,801 B2
(45) Date of Patent: Aug. 26, 2014

(54) SECURE MACHINE ENROLLMENT IN MULTI-TENANT SUBSCRIPTION ENVIRONMENT

(75) Inventors: Murali Krishna Sangubhatla, Kirkland, WA (US); Dharshan Rangegowda, Sammamish, WA (US); Morgan Asher Brown, Redmond, WA (US); Jiazhen Chen, Bellevue, WA (US); Anthony S. Chavez, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 136 days.

(21) Appl. No.: 13/286,001

(22) Filed: Oct. 31, 2011

(65) Prior Publication Data

US 2013/0111558 A1   May 2, 2013

(51) Int. Cl.
*H04L 29/06* (2006.01)
*G06F 21/33* (2013.01)

(52) U.S. Cl.
CPC ............. *G06F 21/33* (2013.01); *H04L 63/102* (2013.01)
USPC .......................................................... 726/9

(58) Field of Classification Search
None
See application file for complete search history.

(56) References Cited

U.S. PATENT DOCUMENTS

| | | | |
|---|---|---|---|
| 7,685,430 B1* | 3/2010 | Masurkar | 713/182 |
| 8,417,723 B1* | 4/2013 | Lissack et al. | 707/781 |
| 2008/0201767 A1* | 8/2008 | Williams et al. | 726/6 |
| 2008/0256607 A1* | 10/2008 | Janedittakarn et al. | 726/4 |
| 2009/0228967 A1 | 9/2009 | Gbadegesin | |
| 2009/0327471 A1* | 12/2009 | Astete et al. | 709/223 |
| 2010/0125612 A1* | 5/2010 | Amradkar et al. | 707/802 |
| 2010/0211782 A1 | 8/2010 | Auradkar | |
| 2011/0137991 A1 | 6/2011 | Russell | 709/204 |
| 2011/0231912 A1* | 9/2011 | Lee et al. | 726/7 |
| 2011/0231919 A1 | 9/2011 | Vangpat | |
| 2011/0246765 A1 | 10/2011 | Schibuk | |
| 2012/0109947 A1* | 5/2012 | Yu et al. | 707/725 |
| 2012/0331518 A1* | 12/2012 | Lee | 726/1 |

OTHER PUBLICATIONS

Cisco; "*Virtualized Multi-Tenant Data Center Solution for Infrastructure-as-a-Service*", © 2010; accessed Aug. 4, 2011 at http://www.cisco.com/en/US/solutions/collateral/ns340/ns517/ns224/ns836/white_paper_c11-604559.html; 10 pgs.

(Continued)

*Primary Examiner* — David Pearson
(74) *Attorney, Agent, or Firm* — Ben Tabor; Kate Drakos; Micky Minhas

(57) ABSTRACT

In a multi-tenant environment, machines across the Internet, belonging to a particular subscription are securely enrolled with the tenant's subscription. Authentication of the machines is delegated to each of the tenant's own on-premise authentication mechanism The trust relationship with the tenant's authentication service is used to validate the security token presented by the machine being authenticated. Once authenticated, the machine has authorization (e.g. SSL machine cert for identity, security token, etc.,) to access the subscription. Each tenant within the multi-tenant environment can provide its own level of authentication. The machine presents the security token to the multi-tenant environment for requests for resources (e.g. services/content) from a user. When a request is received from a machine to access a resource, the multi-tenant environment determines from the issued token whether or not the machine is authorized to access the requested resources.

20 Claims, 4 Drawing Sheets

(56) References Cited

OTHER PUBLICATIONS

Milestone Systems, Inc.; "*Secure Access for Cloud Applications*"; May 2011; accessed Aug. 4, 2011 at http://www.milestonesystems.com/newsletter/2011/05/secure-access-cloud-applications/; 3 pgs.

IBM; "*Point of View: Security and Cloud Computing*"; Nov. 2009; accessed at http://www-03.ibm.com/systems/au/resources/systems_ap_TIW14045USEN_HR.pdf; 20 pgs.

ZapThink.com; "*Cloud Security: Not an Oxymoron*"; Mar. 24, 2011; accessed as http://www.zapthink.com/2011/3/24/cloud-security-not-an-oxymoron; 5 pgs.

NetApp.com; "*Secure Multi-Tenancy for Cloud Architecture with NetApp, Cisco, and VMware*"; access Aug. 4, 2011 at http://www.netapp.com/us/technology/secure-multi-tenancy.html; 2 pgs.

TechTarget.com; "*Securing a multi-tenant environment*"; accessed Aug. 4, 2011 at http://searchcloudsecurity.techtarget.com/tip/Securing-a-multi-tenant-environment; 14 pgs.

International Search Report mailed Mar. 29, 2013, in PCT/US2012/061248.

\* cited by examiner

SECURE MACHINE ENROLLMENT IN MULTI-TENANT SUBSCRIPTION ENVIRONMENT

BACKGROUND

Many Internet services attempt to prevent unauthorized users from accessing resources provided by the service. For example, a service may issue a link to an authorized user to access content at the service. A service may also require a user to provide authentication credentials to access resources provided by the service. Anyone who obtains access to the link or to the user's authentication credentials, however, can access the resources.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a multi-tenant environment, machines across the Internet, belonging to a particular subscription are securely enrolled with the tenant's subscription. Authentication of the machines is delegated to each of the tenants own on-premise authentication mechanism (e.g. Public Key Infrastructure "PKI", Security Token Service "STS", Kerberos, . . . ). The trust relationship with the tenant's authentication service (PKI root certificate/issuer, certificate trust, . . . ) is used to validate the token presented by the machine attempting to be authenticated. Once authenticated, the machine has authorization (e.g. SSL machine cert for identity, token, . . . ) to access the subscription. Each tenant within the multi-tenant environment can provide its own level of authentication. A trust relationship (e.g. Public Key Infrastructure "PKI", Security Token Service "STS", . . . ) is established between each of the tenants and the multi-tenant environment. The machine presents the token to the multi-tenant environment for requests for resources (e.g. services/content). When a request is received from a machine to access a resource, the multi-tenant environment determines from the issued token whether or not the machine is authorized to access the requested resources.

DETAILED DESCRIPTION

Figure 1:
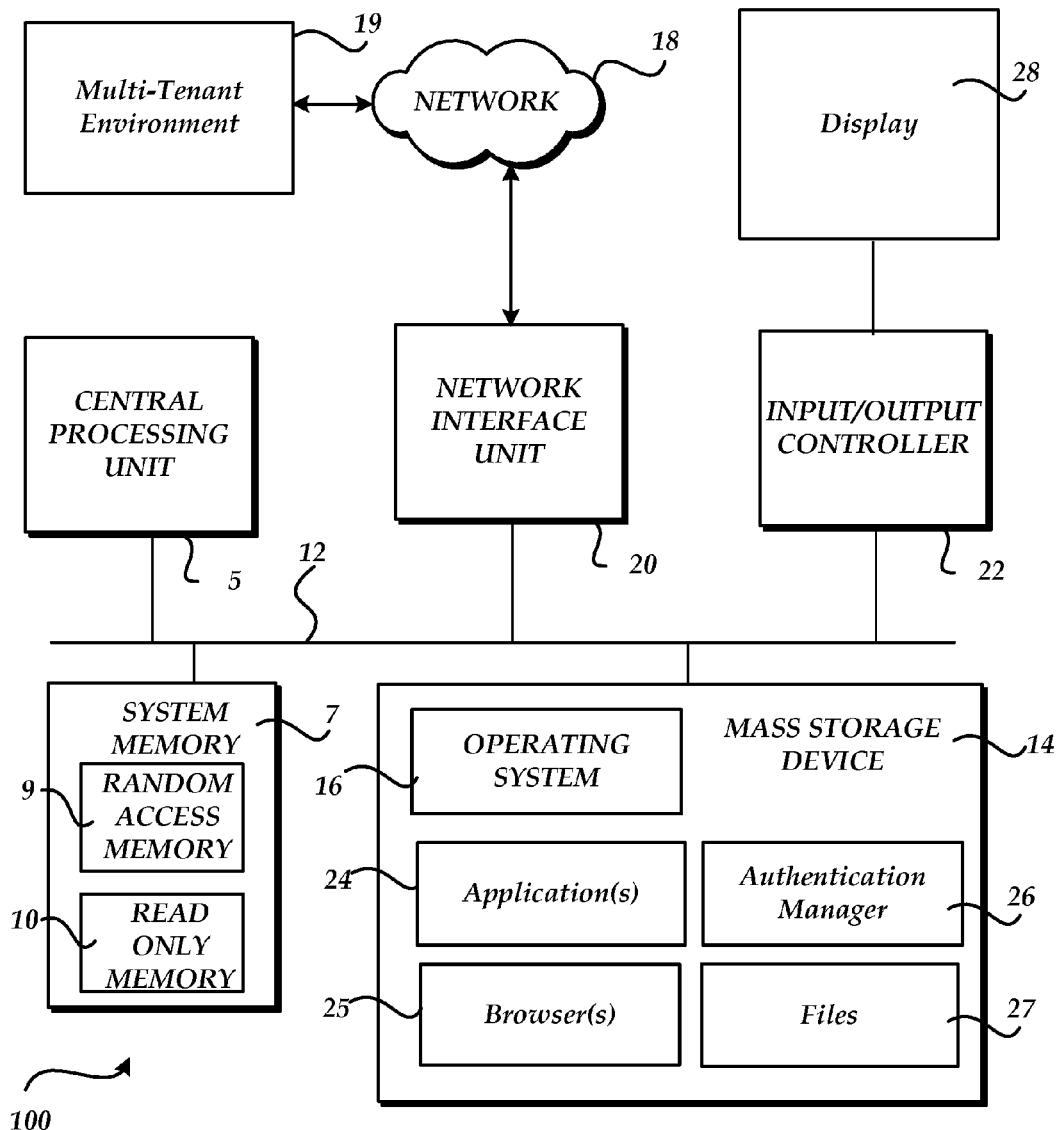
FIG. 1 illustrates an exemplary computing device.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a server computing device, a desktop computing device, a mobile computing device (e.g. smartphone, notebook, tablet . . . ) and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, application(s) 24, and other program modules, such as Web browser applications 25, files 27 (e.g. files, images, other content), and authentication manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, such as a touch input device. The touch input device may utilize any technology that allows single/multi-touch input to be recognized (touching/non-touching). For example, the technologies may include, but are not limited to: heat, finger pressure, high capture rate cameras, infrared light, optic capture, tuned electromagnetic induction, ultrasonic receivers, transducer microphones, laser rangefinders, shadow capture, and the like. According to an embodiment, the touch input device may be configured to detect near-touches (i.e. within some distance of the touch input device but not physically touching the touch input device). The touch input device may also act as a display 28. The input/output controller 22 may also provide output to one or more display screens, a printer, or other type of output device.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

Embodiments of the invention may be practiced via a system-on-a-chip (SOC) where each or many of the components/processes illustrated in the FIGURES may be integrated onto a single integrated circuit. Such a SOC device may include one or more processing units, graphics units, communications units, system virtualization units and various application functionality all of which are integrated (or "burned") onto the chip substrate as a single integrated circuit. When operating via a SOC, all/some of the functionality, described herein, with respect to the Unified Communications via application-specific logic integrated with other components of the computing device/system 100 on the single integrated circuit (chip).

As mentioned briefly above, a number of program modules and data files may be stored in the mass storage device 14 and RAM 9 of the computer 100, including an operating system 16 suitable for controlling the operation of a networked personal computer, such as the WINDOWS SERVER®, WINDOWS 7® operating systems from MICROSOFT CORPORATION of Redmond, Wash.

The mass storage device 14 and RAM 9 may also store one or more program modules. In particular, the mass storage device 14 and the RAM 9 may store one or more applications 24, such as productivity applications, and may store one or more Web browsers 25. The Web browser 25 is operative to request, receive, render, and provide interactivity with electronic documents, such as a Web page. According to an embodiment, the Web browser comprises the INTERNET EXPLORER Web browser application program from MICROSOFT CORPORATION. Other Web browser application programs from other manufacturers may be utilized to embody the various aspects of the present invention, such as the FIREFOX Web browser application from the MOZILLA FOUNDATION.

Authentication manager 26 is configured to perform authentication operations used in securely enrolling a tenant's machines with a multi-tenant environment 19. Authentication manager 26 is part of a multi-tenant environment that provides resources (e.g. services, data . . . ) to different tenants. Authentication of the machines is delegated to each of the tenants own on-premise authentication mechanism (e.g. Public Key Infrastructure "PKI", Security Token Service "STS", Kerberos, . . . ). The trust relationship with the tenant's authentication service (PKI root certificate/issuer, certificate trust, . . . ) is used to validate the security token presented by the machine attempting to be authenticated. Once authenticated, the machine has authorization (e.g. SSL machine cert for identity, security token, . . . ) to access the subscription. Each tenant within the multi-tenant environment can provide its own level of authentication. A trust relationship (e.g. Public Key Infrastructure "PKI", Security Token Service "STS", . . . ) is established between each of the tenants and the multi-tenant environment. The machine presents the security token to the multi-tenant environment for requests for resources (e.g. services/content). When a request is received from a machine to access a resource, the multi-tenant environment determines from the issued token whether or not the machine is authorized to access the requested resources. Additional details regarding the operation of authentication manager 26 will be provided below.

Figure 2:
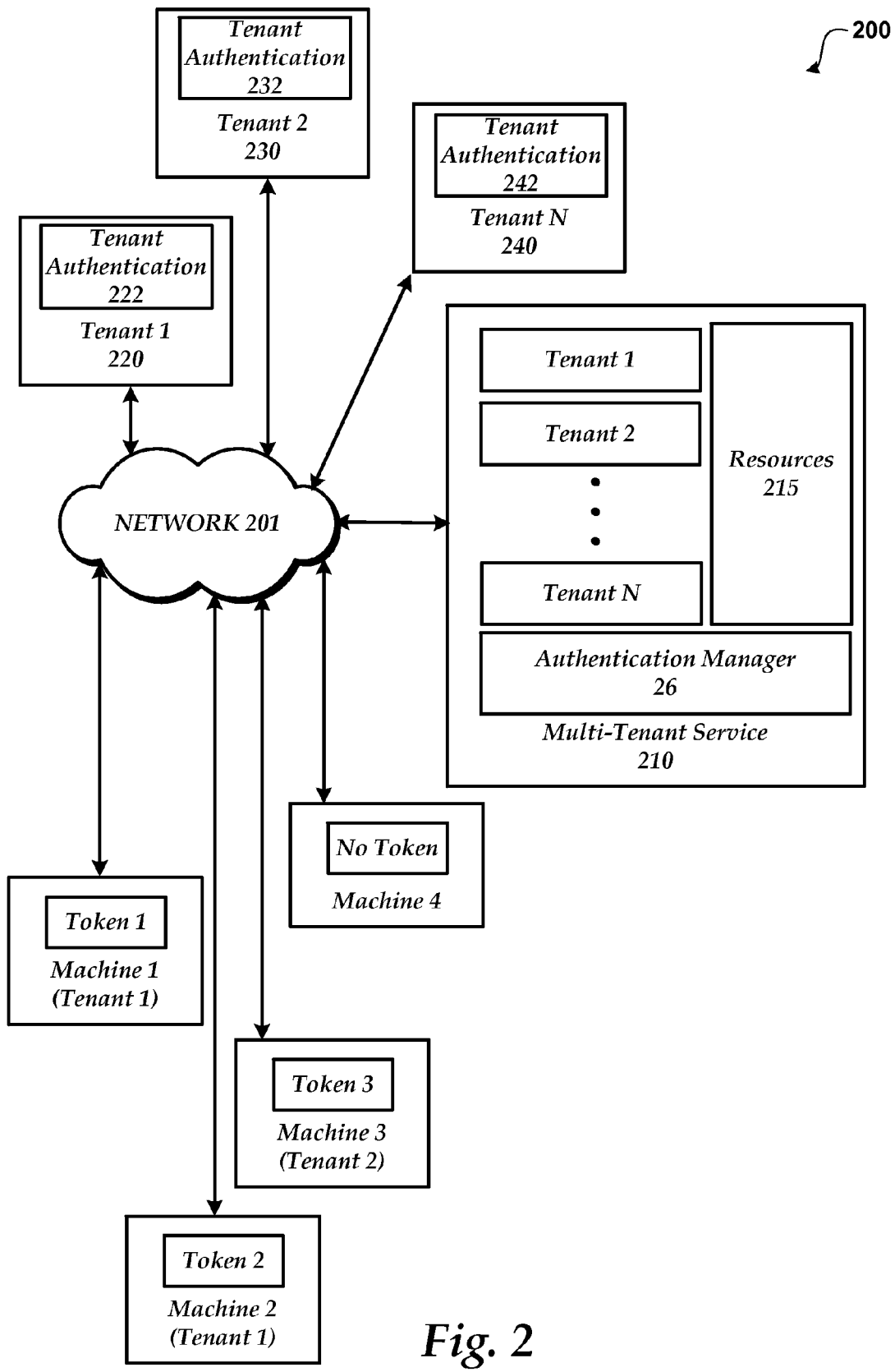
FIG. 2 illustrates an exemplary system for a securely enrolling machines with a multi-tenant environment.

FIG. 2 illustrates an exemplary system for a securely enrolling machines in a multi-tenant environment. As illustrated, system 200 includes multi-tenant environment 210, tenant 1 (220), tenant 2 (230), tenant N (240), network 201 and machines 1-4.

Multi-tenant environment 210 provides resources 215 to any number of tenants (e.g. Tenants 1-N). According to an embodiment, multi-tenant environment 210 is a cloud based service that provides resources to tenants subscribed to the service and maintains each tenant's data separately and protected from other tenant data.

Authentication manager 26 is configured to determine when to provide a resource in response to a request from a machine. In response to receiving a request from a machine (e.g. machine 1, 2, 3, or 4) for a resource (e.g. data and/or service), authentication manager 26 determines when the machine is authorized by the tenant.

Authentication of the tenant's machines is delegated from the multi-tenant environment 210 to each of the tenants that use the service (e.g. tenants 1-N). Each tenant may select its own authentication rules and protocols. For example, tenant 1 may use tenant authentication 222 that is different from tenant authentication 232 of tenant 2 that is different from tenant authentication 242 of tenant N. Some tenants may require a machine to be authenticated one time, whereas other tenants may require a more frequent authentication of a machine (e.g. daily, weekly, monthly, yearly . . . ). Some tenants may use Public Key Infrastructure "PKI" authentication, some tenants may use Security Token Service "STS" protocols, some may use Kerberos authentication, some may use manual approval, some may use a combination of authentication protocols, and the like. Multi-tenant environment 210 establishes a trust relationship with each of the tenants using the tenants authentication preferences. Authentication manager 26 may be configured to accept certificates from different certificate issuers and/or different types of certificates/tokens.

In response to receiving a request from a machine for a resource, the authentication manager 26 determines the tenant associated with the request and determines when to authenticate the machine based on the authentication rules specified by that tenant. When the machine is to be authenticated, a request is made to the tenant to attempt to authenticate the machine. When the tenant authenticates the machine using its authentication procedure, the tenant uses a token to access the subcription. The token may be a certificate, a security token, or some other authentication credential that identifies the machine as being authenticated by the client. In the example illustrated, machine 1 has been issued token 1 from tenant 1, machine 2 has been issued token 2 from tenant 1, machine 3 has been issued token 3 from tenant 2 and machine 4 has not been issued a token. For example, a user of machine 4 may have accessed authentication credentials to access the multi-tenant environment but the machine they are using to access the multi-tenant environment 210 is not authorized by the tenant having a subscription to the multi-tenant environment 210.

When tenant 1's machine 1 contacts multi-tenant environment 210 as illustrated, machine 1 presents Token 1 issued by Tenant 1's STS or PKI to authentication manager 26. Multi-tenant environment 210 verifies the identity of machine 1 using authentication manager 26 since it has an established trust relationship with Tenant 1's STS or PKI certification authority (CA) and authentication manage 26 authorizes machine 1 to access resources in Tenant 1's subscription.

Figure 3:
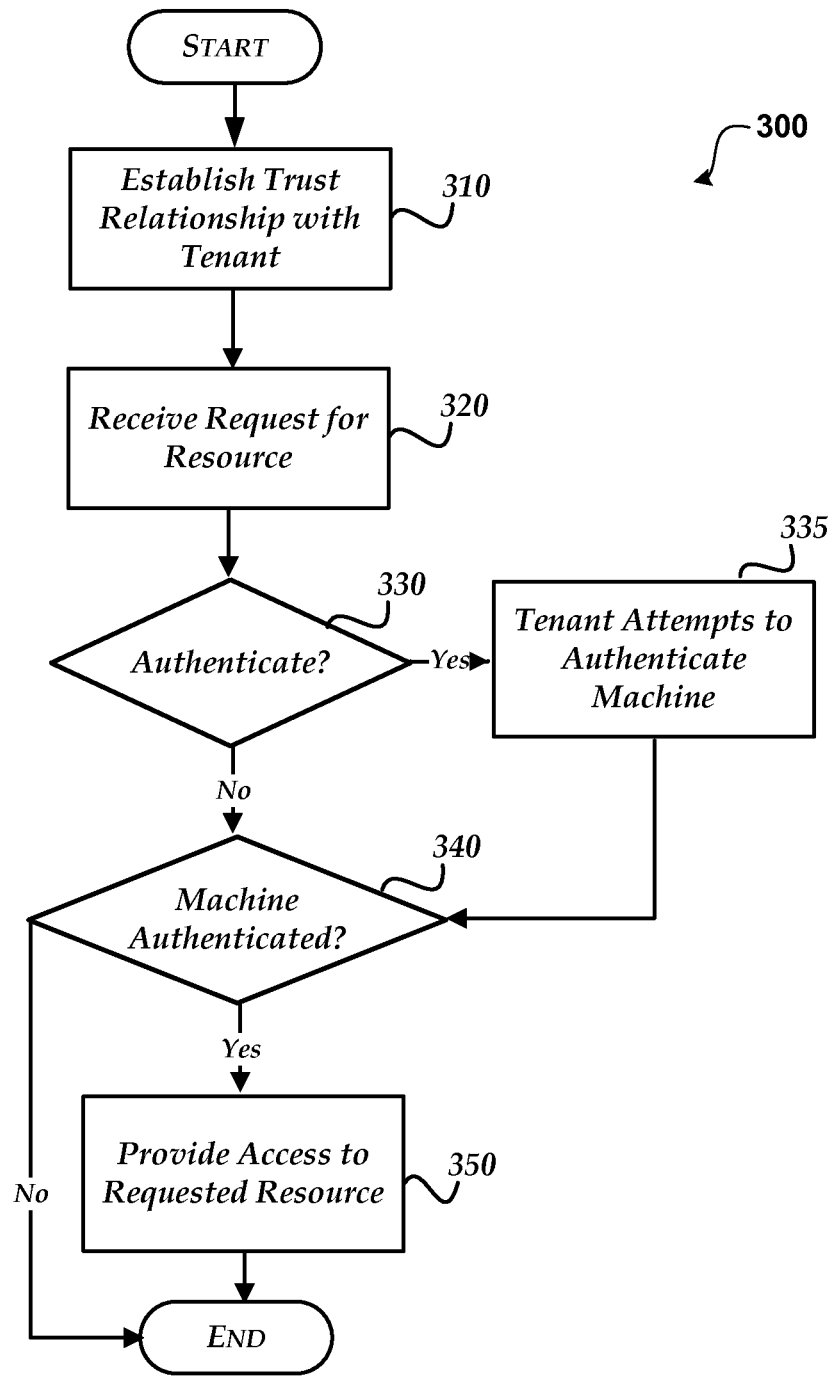
FIG. 3 shows a process for authenticating a machine requesting a resource from a multi-tenant environment.
Figure 4:
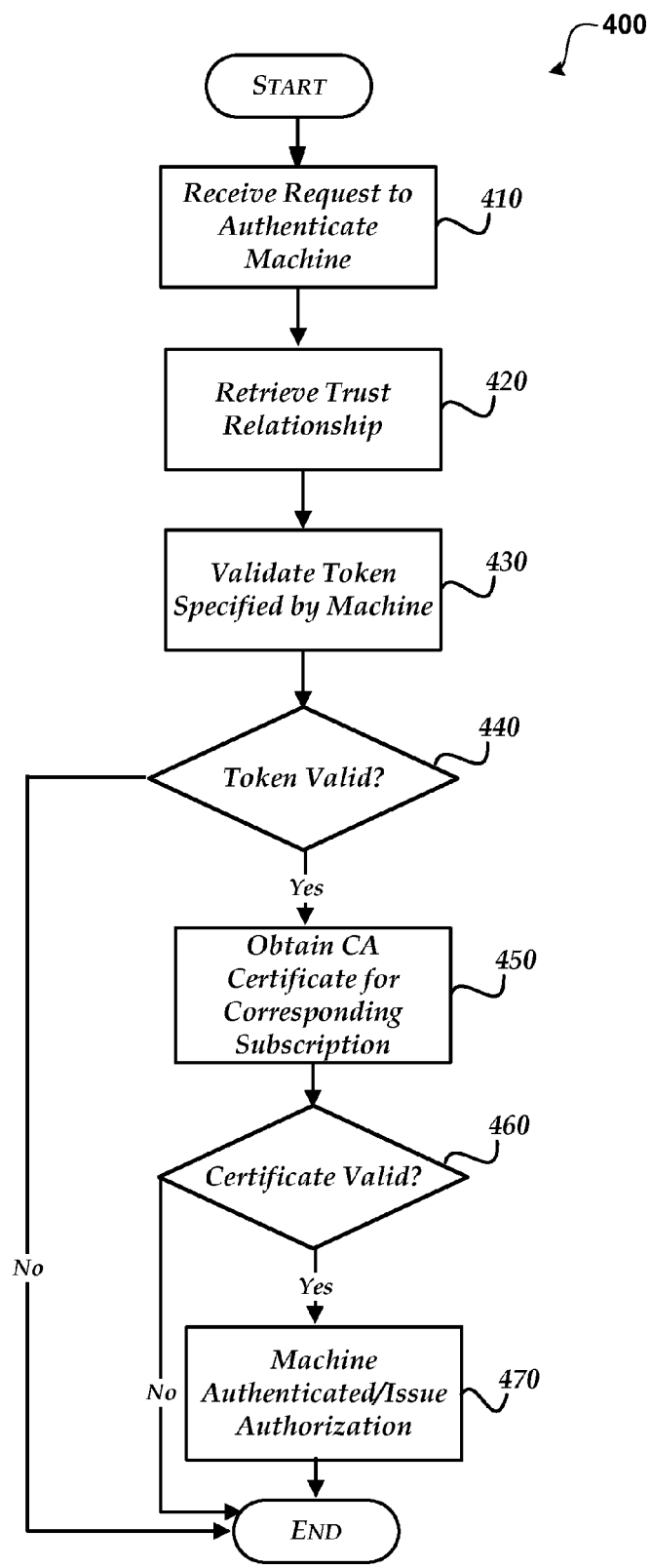
FIG. 4 shows a process for a tenant authenticating a machine for a multi-tenant environment.

FIGS. 3-4 show illustrative processes for securely enrolling and authenticating machines in a multi-tenant environment. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 3 shows a process for authenticating a machine requesting a resource from a multi-tenant environment.

After a start operation, the process flows to operation 310, where the multi-tenant environment establishes a trust relationship with each tenant. Each tenant establishes its own authentication environment. For example, one tenant may use an existing Public Key Infrastructure (PKI) service to issue certificates to authenticated machines whereas another tenant may use a Security Token Service (STS) to issue signed security tokens to authenticated machines that are associated with the tenant. The trust relationships are established between the multi-tenant environment and each tenant using the tenant's authentication protocols. For example, an administrator can set up a trust relationship with multi-tenant environment by setting up a trust relationship between the PKI CA or STS and the multi-tenant environment.

Moving to operation 320, the multi-tenant environment receives a request for a resource from a machine.

Flowing to decision operation 330, a determination is made as to whether to authenticate the machine and/or user before providing access to the resource. The determination to authenticate a machine may be made on a tenant by tenant basis. For example, one tenant may require a one-time authentication of a machine, whereas another tenant may require authentication of the machine more often. According to an embodiment, when a machine does not include a token with its request, the machine fails authentication. When the machine is to be authenticated, the process flows to operation 335. When the machine is not to be authenticated, the process flows to decision operation 340.

At operation 335, the tenant attempts to authenticate the machine (See FIG. 4 and related description). The tenant performs the authentication of the machine using its selected authentication procedure. Once authenticated, the machine uses the token (e.g. certificate/token) to access resources from the subscription.

At decision operation 340, a determination is made as to whether or not the machine has been authenticated by the tenant. According to an embodiment, a token with the request is used to verify that the machine is authorized by the tenant to access the resource(s) of the service. When the machine is not authenticated, the process moves to an end operation and the resource is not provided to the requesting machine. When the machine has been authenticated by the tenant, the process flows to operation 350.

At operation 350, the authenticated machine is provided access to the requested resource.

The process then moves to an end operation and returns to processing other actions.

FIG. 4 shows a process for a tenant authenticating a machine for a multi-tenant environment.

After a start operation, the process flows to operation 410, where a request is received to authenticate a machine. The tenant receives the request from the multi-tenant environment to perform the authentication procedures. The authentication procedures to authenticate the machine are performed by the tenant and/or one or more designated third party service(s) selected by the tenant. Each tenant may perform different authentication procedures. Some tenants may use Public Key Infrastructure "PKI" authentication, some tenants may use Security Token Service "STS" protocols, some may use Kerberos authentication, some may use manual approval, some may use a combination of authentication protocols, and the like.

Flowing to operation 420, the established trust relationship with the tenant for the machine is retrieved. For example, the root CA certificate used by the tenant is obtained. According to an embodiment, the certificate issuer identifier is obtained from the client through a Transport Layer Security (TLS) connection with the machine requesting to be authenticated.

Moving to operation 430, a token specified by the machine is attempted to be validated using the retrieved trust relationship to ensure that the token was issued to the machine by the tenant.

Flowing to decision operation 440, a determination is made as to whether the token is valid. When the token is not valid, the process moves to an end operation. When the token is valid, the process flows to operation 450.

Transitioning to operation 450, the certification authority certificate that corresponds to the subscription of the machine is obtained. The certificate may be stored by the multi-tenant environment and/or obtained from the tenant. Moving to decision operation 460, a determination is made as to whether the certificate is valid. When the certificate is not valid, the process moves to an end operation and the authentication fails. When the certificate is valid, the process moves to operation 470.

At operation 470, the machine is authenticated and can access the subscription that is associated with the tenant and the token.

The process then moves to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for securely enrolling a machine in a multi-tenant environment, comprising:

receiving a request at a multi-tenant environment from a machine to access a resource of a tenant in the multi-tenant environment that includes a token, wherein the token was previously issued to the machine by the tenant upon authentication by the tenant based on the tenant's own authentication mechanism;

retrieving a trust relationship previously established between the multi-tenant environment with an authentication service of the tenant;

determining the token is valid using the retrieved trust relationship;

determining the machine is authorized by the tenant to access the resource of the tenant using the token and the trust relationship; and authorizing access to the resource upon determining the machine is authenticated by the tenant.

2. The method of claim 1, wherein determining the token is valid comprises determining the token was issued to the machine from the tenant.

3. The method of claim 1, further comprising requesting the tenant associated with the resource to attempt to authenticate the machine upon determining to authenticate the machine.

4. The method of claim 1, further comprising establishing a trust relationship between the multi-tenant environment and each of the tenants of the multi-tenant environment.

5. The method of claim 4, wherein the trust relationship uses at least one of: Public Key Infrastructure (PKI) and Security Token Service (STS).

6. The method of claim 4, wherein each of the tenants provides to the multi-tenant environment at least one issuer of certificates that is authorized to authenticate machines of the tenant.

7. The method of claim 1, wherein the multi-tenant environment is a cloud based service that provides resources to different tenants at different network locations wherein data that is associated with each of the different tenants is protected from access by the other tenants.

8. The method of claim 1, wherein each tenant specifies its authentication procedures that employ different authentication protocols.

9. The method of claim 1, further comprising receiving login information from a user of the machine at the multi-tenant environment and associating the user with a tenant of the multi-tenant environment.

10. A computer-readable device, having computer-executable instructions for excluding a machine from a multi-tenant environment, comprising:

receiving login information from a user of the machine;

granting the user access to a multi-tenant cloud-based service;

receiving a request at the multi-tenant cloud-based service from the machine to access a resource of the tenant in a multi-tenant environment, wherein the request includes a token;

retrieving a trust relationship previously established between the multi-tenant cloud-based service with an authentication service of the tenant;

determining the machine is not authorized by the tenant to access the resource of the tenant by using the retrieved trust relationship to determine the token was not issued to the machine from the tenant based on the tenant's own authentication mechanism; and denying access to the resource upon determining the machine to not be authenticated by the tenant.

11. The computer-readable device of claim 10, further comprising requesting the tenant that is associated with the resource to attempt to authenticate the machine.

12. The computer-readable device of claim 10, further comprising establishing a trust relationship between the multi-tenant environment and an authentication service of each of the tenants of the multi-tenant environment using authentication protocols defined by each of the tenants.

13. The computer-readable device of claim 12, wherein the trust relationship uses at least one of: Public Key Infrastructure (PKI) and Security Token Service (STS).

14. The computer-readable device of claim 12, wherein each of the tenants provides to the multi-tenant environment at least one issuer of certificates that is authorized to authenticate machines of the tenant.

15. The computer-readable device of claim 10, wherein each tenant specifies its own level of authentication procedures defining when to allow access to the resource.

16. The computer-readable device of claim 10, further comprising receiving login information from a user of the machine at the multi-tenant environment and associating the user with a tenant of the multi-tenant environment.

17. A system for securely enrolling a machine in a multi-tenant environment, comprising:

a network connection that is coupled to tenants of the multi-tenant environment;

a processor and a computer-readable medium;

an operating environment stored on the computer-readable medium and executing on the processor; and an authentication manager operating under the control of the operating environment and operative to:

receive a request from a machine external to the multi-tenant environment to access a resource of a tenant, wherein the request includes a token previously issued to the machine by the tenant upon authentication by the tenant based on the tenant's own authentication mechanism;

retrieve a trust relationship previously established between the multi-tenant environment with an authentication service of the tenant;

determine the machine is authorized by the tenant to access the resource of the tenant using the retrieved trust relationship to determine the token was issued to the machine from the tenant that authorizes the machine to access the resource; and authorize access to the resource upon determining the machine is authenticated by the tenant.

18. The system of claim 17, further comprising requesting the tenant associated with the resource to attempt to authenticate the machine upon determining to authenticate the machine.

19. The system of claim 17, further comprising establishing a trust relationship between the multi-tenant environment and each of the tenants of the multi-tenant environment using authentication protocols defined by each of the tenants, wherein the trust relationship uses at least one of: Public Key Infrastructure (PKI) and Security Token Service (STS).

20. The system of claim 17, wherein each tenant specifies its own level of authentication procedures defining when to allow access to the resource.

* * * * *